US008914727B2

(12) United States Patent
Park et al.

(10) Patent No.: US 8,914,727 B2
(45) Date of Patent: Dec. 16, 2014

(54) METHOD AND APPARATUS FOR PROVIDING REMOTE USER INTERFACE LIST

(75) Inventors: Ho-Yeon Park, Seoul (KR); Bo-Sun Jung, Gyeonggi-do (KR); Jun-Hyung Kim, Gyeonggi-do (KR); Ji-Eun Keum, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 648 days.

(21) Appl. No.: 12/960,913

(22) Filed: Dec. 6, 2010

(65) Prior Publication Data
US 2011/0138290 A1 Jun. 9, 2011

(30) Foreign Application Priority Data
Dec. 4, 2009 (KR) ......................... 10-2009-0120191
Mar. 8, 2010 (KR) ......................... 10-2010-0020589

(51) Int. Cl.
G06F 15/177 (2006.01)
H04L 12/28 (2006.01)
H04L 29/08 (2006.01)

(52) U.S. Cl.
CPC ............ H04L 12/2809 (2013.01); H04L 67/16 (2013.01); H04L 67/04 (2013.01); H04L 67/02 (2013.01)
USPC ........................................................ 715/734

(58) Field of Classification Search
None
See application file for complete search history.

(56) References Cited

U.S. PATENT DOCUMENTS 6,240,443 B1 *  5/2001  Suzuki et al. ................. 709/204
7,539,152 B2     5/2009  Morioka
7,904,575 B2     3/2011  Jung et al.
2003/0028639 A1 *  2/2003  Yamamoto et al. ........... 709/225
2003/0146941 A1    8/2003  Bailey et al.
2005/0120361 A1    6/2005  Bailey et al.
2005/0138193 A1    6/2005  Encarnacion et al.
2005/0251549 A1 * 11/2005  Hlasny ......................... 709/203
2006/0067489 A1    3/2006  Morioka
2007/0112958 A1    5/2007  Kim
2007/0124786 A1    5/2007  Kim et al.
2007/0233804 A1 * 10/2007  Palekar et al. ................ 709/208
2007/0288550 A1 * 12/2007  Ise et al. ....................... 709/203
2008/0205419 A1    8/2008  Shin et al.
2009/0055648 A1    2/2009  Kim et al.
2009/0210488 A1    8/2009  Lee
2009/0265645 A1 * 10/2009  Park et al. ..................... 715/762
2010/0114851 A1 *  5/2010  Wernecke .................... 707/705

FOREIGN PATENT DOCUMENTS

| CN | 101507179     | 8/2009 |
| JP | 11-272610     | 10/1999 |
| JP | 2006-099675   | 4/2006 |
| JP | 2011-519076   | 6/2011 |
| WO | WO 2008/023918 | 2/2008 |
| WO | WO 2009/104908 | 8/2009 |

* cited by examiner

Primary Examiner — William Bashore
Assistant Examiner — Rayeez Chowdhury
(74) Attorney, Agent, or Firm — The Farrell Law Firm, P.C.

(57) ABSTRACT

A method for providing a User Interface (UI) list in a network by letting a specific terminal, which has an application communicating with a remote server, receive a request for the UI list from an arbitrary terminal; and providing at least one of a UI list provided from the remote server and a UI list included in the specific terminal using the application. The specific terminal may combine the UI list provided from the remote server and the UI list included in the specific terminal to thereby provide the arbitrary terminal with a combined list and the arbitrary terminal may select the desired remote UI through the provided UI list.

10 Claims, 7 Drawing Sheets

METHOD AND APPARATUS FOR PROVIDING REMOTE USER INTERFACE LIST

PRIORITY

This application claims priority under 35 U.S.C. §119(a) to applications filed in the Korean Intellectual Property Office on Dec. 4, 2009 and Mar. 8, 2010, and assigned Serial Nos. 10-2009-0120191 and 10-2010-0020589, respectively, the contents of which are incorporated herein by reference.

BACKGROUND OF THE INVENTION

1. Field of the Invention

The present invention relates generally to a remote User Interface (UI) system using a remote UI and more particularly to a method and an apparatus for proving a terminal with a remote UI list in a remote user interface system.

2. Description of the Related Art

Numerous studies for improving home-network technology have been actively done by many standardizing associations in the industry, such as the Digital Living Network Alliance (DLNA), Home Audio-Video Interoperability (HAVi), Universal Plug and Play (UPnP) and the like.

In the home-network technology, Remote User Interface (RUI) technology may be adopted so as to allow one apparatus to control another apparatus. Generally, RUI technology is based on client-server architectures, wherein a RUI client fetches a UI from a RUI server, so that a user at the RUI client can control the RUI server through the UI. Hereinafter, the RUI is referred to as a remote UI and the RUI server is referred to as a remote server.

FIG. 1 is a flow chart for illustrating a method for providing a UI list in a conventional remote UI system. FIG. 1 illustrates a third terminal 10 discovering a second terminal 11 and then making a request for the UI list to fetch the latter. In FIG. 1, the third terminal 10 corresponds to a RUI client and the second terminal 11 corresponds to another terminal, which includes an embedded server enabling to provide the remote UI upon request of the third terminal 11.

Referring to FIG. 1, the third terminal 10 discovers the second terminal 11 and then fetches the remote UI list included in the second terminal by making the request for the remote UI list. Thereafter, the third terminal 10 selects one of the remote UIs in the remote UI list and requests the second terminal 11 for the selected remote UI. Then, the second terminal 11 transmits the requested remote UI to the third terminal 10.

In the conventional method, if the third terminal requests the second terminal for the UI list, the second terminal simply provides the UI list included in the second terminal. That is, when the third terminal requests the second terminal for the UI list, it is not possible for the third terminal to fetch another UI list included in another remote server (not shown) interconnected with the second terminal. Also, it is not possible to combine the remote UI list included in the second terminal with the remote UI list included in the remote server for use.

SUMMARY OF THE INVENTION

Accordingly, the present invention has been made to solve the above-mentioned problems occurring in the prior art, and an aspect of the present invention provides a method and an apparatus for efficiently providing a remote UI list in a remote UI system.

Another aspect of the present invention provides a method and an apparatus for efficiently providing a remote UI list by way of communication between terminals and remote servers in a remote UI system.

Further, the present invention provides a method and an apparatus for providing a combination of a number of remote UI lists provided by way of communication in a remote UI system.

In accordance with the present invention, there is provided a method for providing a UI list in a remote system, the method including letting a first terminal which communicates a remote server drive an application downloaded from the remote server; on the basis of a message that an embedded server in the first terminal receives from the application, producing a new UI list by combining a UI list currently included in the embedded server and a UI list of the remote server enclosed in the message; letting the embedded server in the first terminal receive a request for the UI list from a second terminal; and, letting the embedded server in the first terminal provide the second terminal with the newly-produced UI list. Also, in accordance with an aspect of the present invention, there is provided a terminal apparatus for providing a UI list in a remote UI system the apparatus including a browser including an application downloaded from the remote server; and, an embedded server which, on the basis of a message received from the application, produces a new UI list by combining a current UI list and a UI list of the remote server enclosed in the message, and provides the other terminal with the newly-produced UI list according to a reception of a request for the UI list from the other terminal.

As described herein before, it is not possible for a terminal to fetch the remote UI list included in the remote server through another terminal in the prior art. Further, it is not possible to combine the remote UI list included in another terminal with the UI list included in the remote server.

According to the present invention, it is not only possible for a terminal to request another terminal for the remote UI list by way of the communication between terminals in the UI system, but it is also possible to provide the terminal requesting the UI list with at least one of the UI list included in the remote server and the UI list included in another terminal. Further, it is possible to provide the terminal requesting the remote UI list with a combined UI list, which is obtained by combining the UI list included in the remote server and the UI list included in another terminal.

According to the present invention, it is possible for an arbitrary terminal to request a specific terminal including an application for a remote UI list to thereby receive the remote UI list included in the remote server or the remote UI list included in the specific terminal, and receive a combined remote UI list, which is obtained by combining the remote UI list included in the remote server and the remote UI list included in the specific terminal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
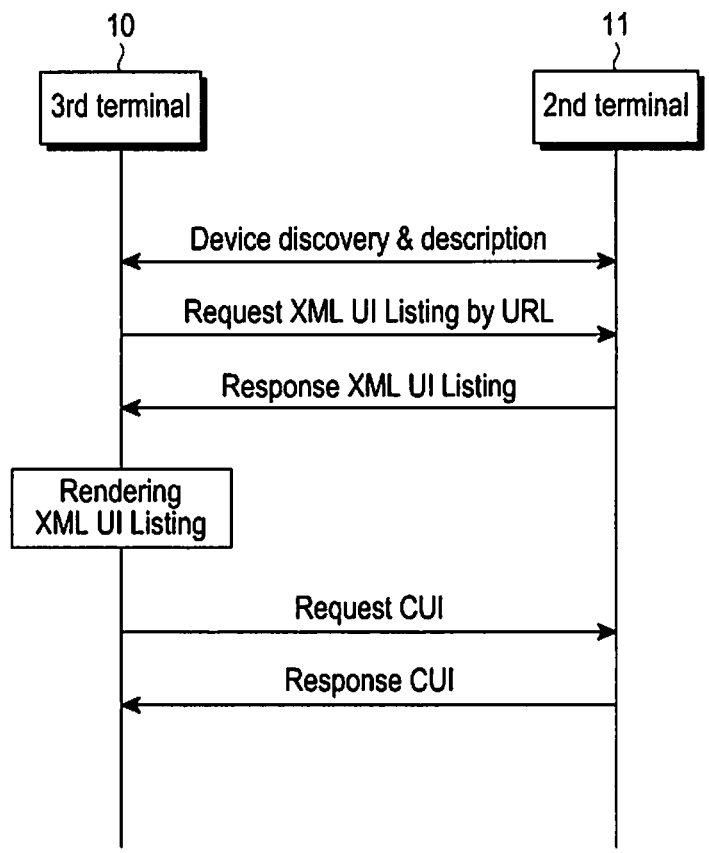
FIG. 1 is a flow chart illustrating a method for providing a UI list in a conventional remote UI system

Hereinafter, embodiments of the present invention will be described with reference to the accompanying drawings. In the following description, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

Hereinafter, a terminal making a request for a UI list is referred to as "a third terminal" and the other terminal providing the third terminal with the UI list through a remote server is referred to as "a second terminal."

In addition to the way that the second terminal simply provides the third terminal with the UI list included in the second terminal, if the second terminal is connected to the remote server, the present invention provides a way of allowing the second terminal to receive the UI list included in the remote server; and the way of providing the third terminal with at least one of the remote UI list included in the second terminal and the remote UI list included in the remote server or way of providing third terminal with a combined remote UI list which is attained by combining the remote UI list included in the second terminal and the remote UI list included in the remote server, when the third terminal requests the second terminal for the UI list.

Generally, the present invention provides a way of allowing the second terminal to combine the remote UI list included in the second terminal and the remote UI list included in the remote server, to thereby provide the third terminal with the combined remote UI list, and of allowing the third terminal to call the second terminal for the remote UI list by way of the remote UI list that the second terminal offers.

In order to achieve the above, the present invention defines the method of allowing the remote server to provide the second terminal with the remote UI list control information, and the method of allowing the second terminal to analyze and establish the provided control information. Further, the present invention defines the method of allowing the second terminal to provide the third terminal with the remote UI list when the second terminal receives the request for the remote UI list from the third terminal.

In accordance with an embodiment of the present application, on the basis of information established before the third terminal makes the request for the remote UI list, it is possible to provide an appropriate remote UI list when receiving the request for remote UI list from the third terminal.

Hereinafter, embodiments of the present invention will be described in detail.

In an embodiment of the present application, the third terminal corresponds to an RUI client and the second terminal corresponds to the terminal including the embedded server which can provide the third terminal with the remote UI list. Also it is assumed that the second terminal includes a handler, which can communicate with the remote server and receive the remote UI list from the remote server.

Figure 2:
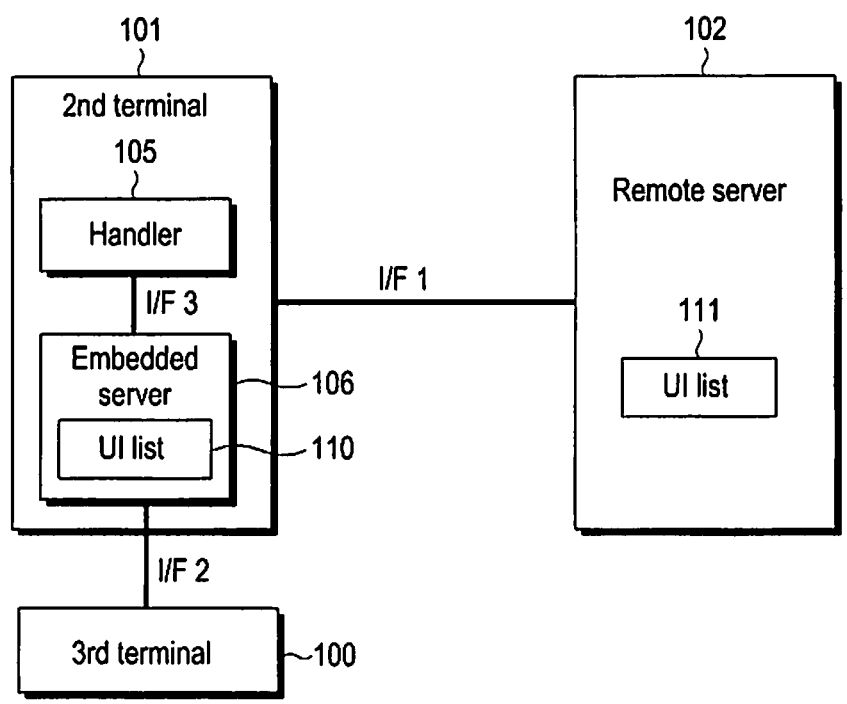
FIG. 2 is a block diagram illustrating a network configuration, wherein a number of remote UI lists are combined and offered to a terminal in accordance with an embodiment of the present invention

FIG. 2 is a block diagram illustrating a network configuration, wherein a number of remote UI lists are combined and offered to a terminal in accordance with an embodiment of the present invention.

Referring to FIG. 2, the third terminal 100 receives through the second terminal 101 the UI lists, which is obtained by combining the UI list 110 included in the second terminal 101 and the UI list 111 included in the remote server 102 connected with the second terminal 101. The remote server 102 has the UI list 111 representing information about the UI list that can be displayed on the third terminal 100; the second terminal 101 includes a handler 105, which can receive from the remote server 102 the information and the method of transmitting the UI list to the third terminal 100; and the handler 105 can receive the UI list 111 from the remote server 102 and transmit the UI list to an embedded server 106. The embedded server 106 included in the second terminal 101 may provide the third terminal 100 with information about the second terminal 101 (Description information). The information about the second terminal 101 received from the embedded server 106 includes the information enabling the third terminal 100 to request the second terminal 101 for the UI list. The third terminal 100 may discover the second terminal 101, receive the information about the second terminal 101, and request the second terminal 101 for the UI list. The third terminal 100 may receive the UI by way of the UI list received from the second terminal 101.

Figure 3:
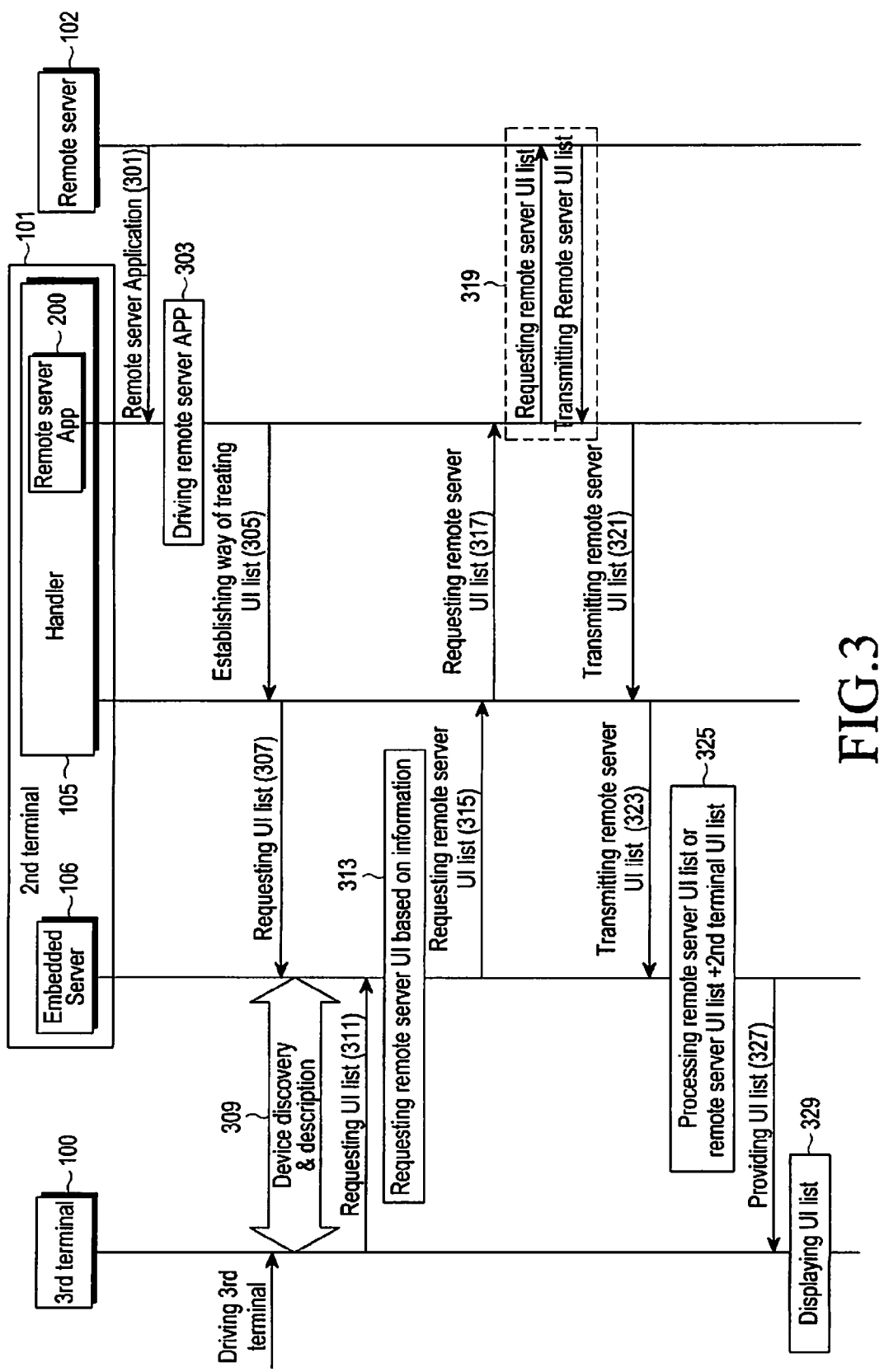
FIG. 3 is a flow chart illustrating a method for providing a UI list in a remote UI system in accordance with an embodiment of the present invention.

FIG. 3 is a flow chart illustrating the method for providing the UI list in the remote UI system in accordance with the embodiment of the present invention, wherein the remote server 102 provides the UI list in a case that the former includes the latter.

Referring FIG. 3, the remote server 102 transmits a remote server application 200 to the handler 105 in the second terminal 101 in step 301. The remote server application 200 includes information that the remote server has the UI list; the way of establishing the corresponding information; and the way of treating the request for the UI list, in a case that the remote server application 200 receives the request for the UI list from the third terminal 100 or the second terminal 101. In step 303, the transmitted remote server application 200 is driven to operate in the second terminal 101; and in step 305, the information that the remote server includes the UI list is transmitted to the handler 105 and the way of treating the UI list is established. In step 307, the handler 105 transmits to the embedded server 106 the information about the established way of treating the UI list. Here, if necessary, the embedded server 106 may inform the third terminal 100 of how to transmit the UI list. Afterward, the third terminal 100 discovers the second terminal 101 in step 309; the third terminal 100 requests the second terminal 101 for the UI lists in step 311; and then, on the basis of the information about the way of treating the UI list established by the remote server application 200, the embedded server 106 included in the second terminal 101 determines whether the UI list included in the second terminal 101 or the UI list included in the remote server is transmitted in step 313.

As the flow chart of FIG. 3 illustrates the state where the remote server application 200 includes the information informing of the existence of the remote server UI list, the embedded server 106 requests the handler 105 for the remote server UI list in step 315. The handler 105 requests the remote server application 200 to fetch the remote server UI list in step 317 and the remote server application 200 requests the remote server 102 for the remote server UI list in step 319. The process in which the remote server application 200 requests the remote server 102 to thereby receive the remote server UI list is executed anytime between after step 303 in which the remote server application 200 is driven and before step 315 in which the embedded server 106 requests the handler 105 for the remote server UI list. In other word, if the remote server application 200 receives the remote server UI list in advance and the embedded server 106 requests the handler 105 for the remote server UI list before the embedded server 106 requests the handler 105 for the remote server UI list, it is also possible to transmit the remote server UI list received in advance to the embedded server 106 without necessitating the transmission of the request to the remote server 102.

Referring to FIG. 3, the remote server application 200 transmits the remote server UI list to the handler 105 in step 321; and the handler 105 transmits the remote server UI list to the embedded server 106 in step 323. In step 325, the embedded server 106 determines whether it directly transmits to the third terminal 100 the remote server UI list received from the handler 105 or it transmits to the third terminal after combining (or modifying) the UI list included in the embedded server and the remote server UI list received from the remote server. Of course, the embedded server 106 directly transmits the remote server UI list received from the handler 105 to the third terminal 100 without any determination mentioned above. In step 327, the embedded server 106 transmits the UI list to the third terminal 100 and in step 329, the third terminal 100 displays on a display the UI list received from the embedded server 106.

Figure 4:
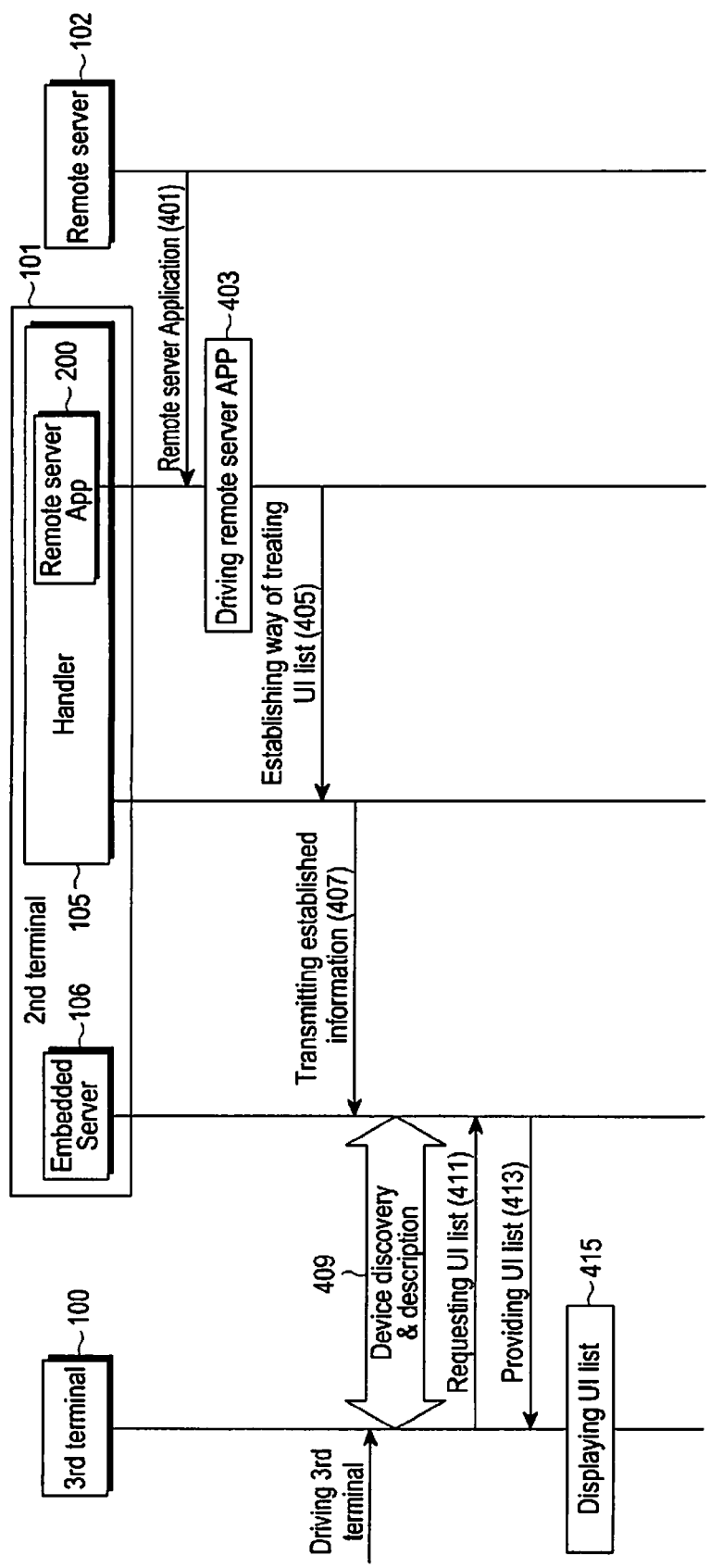
FIG. 4 is a flow chart illustrating a method for providing a UI list in accordance with an embodiment of the present invention, wherein a remote server does not include a UI list.

FIG. 4 is a flow chart illustrating the method for providing the UI list in accordance with the embodiment of the present invention, wherein the remote server does not include the UI list. In other words, FIG. 4 illustrates the operation wherein the remote server 102 does not include the remote server UI list when it receives from the third terminal 100 the request for the UI list through the remote server application 200.

Referring to FIG. 4, the remote server 102 transmits the remote server application 200 to the second terminal 101 in step 401. The corresponding remote server application 200 includes the information in that the remote server 102 currently does not have the UI list available for provision. The remote server application 200 is driven to operate in step 403; the remote server application 200 transmits to the handler 105 the information in that the remote server 102 does not have the UI list available for provision in step 405; and the corresponding information is transmitted to the embedded server 106 in step 407. Thereafter, the third terminal 100 discovers the second terminal 101 in step 409; the third terminal 100 requests the second terminal 101 for the UI list in step 411; the second terminal 101 provides the third terminal 100 with the UI list included in the second terminal 101 without requesting the remote server 102 for the UI list because the second terminal 101 has already received the information in that the remote server 102 does not include the UI list available for provision in step 413. The third terminal 100 displays the UI list received from the second terminal 101 in step 415.

Figure 5:
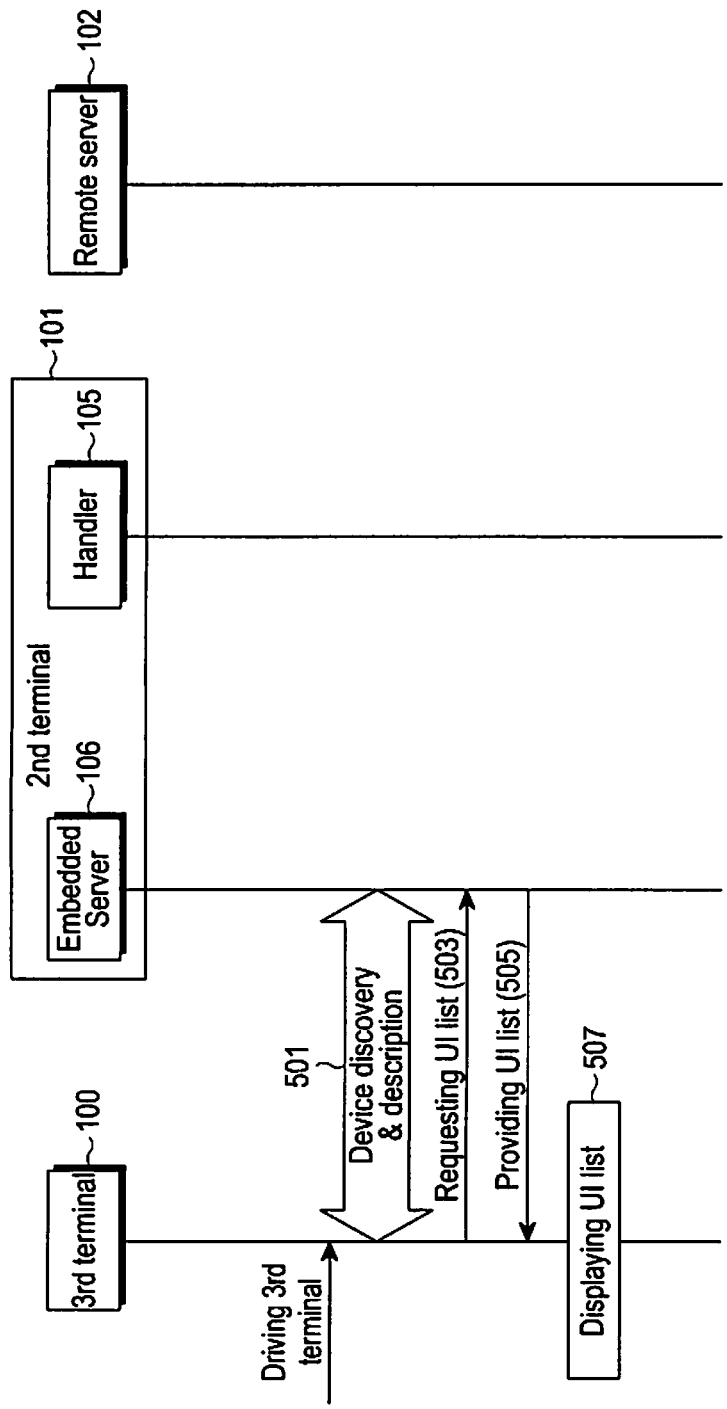
FIG. 5 is a flow chart illustrating a method for providing a UI list in accordance with an embodiment of the present invention, wherein a remote server application of a second terminal does not operate.

FIG. 5 is a flow chart illustrating a method for providing a UI list in accordance with an embodiment of the present invention, wherein a remote server application in a second terminal does not operate. In this case, the third terminal 100 discovers the second terminal 101 in step 501; the third terminal 100 requests the second terminal 101 for the UI list in step 503; the second terminal 101 transmits the UI list included in the second terminal to the third terminal 100 in step 505. Also, the third terminal 100 displays the UI list received from the second terminal 101 in step 507.

Figure 6:
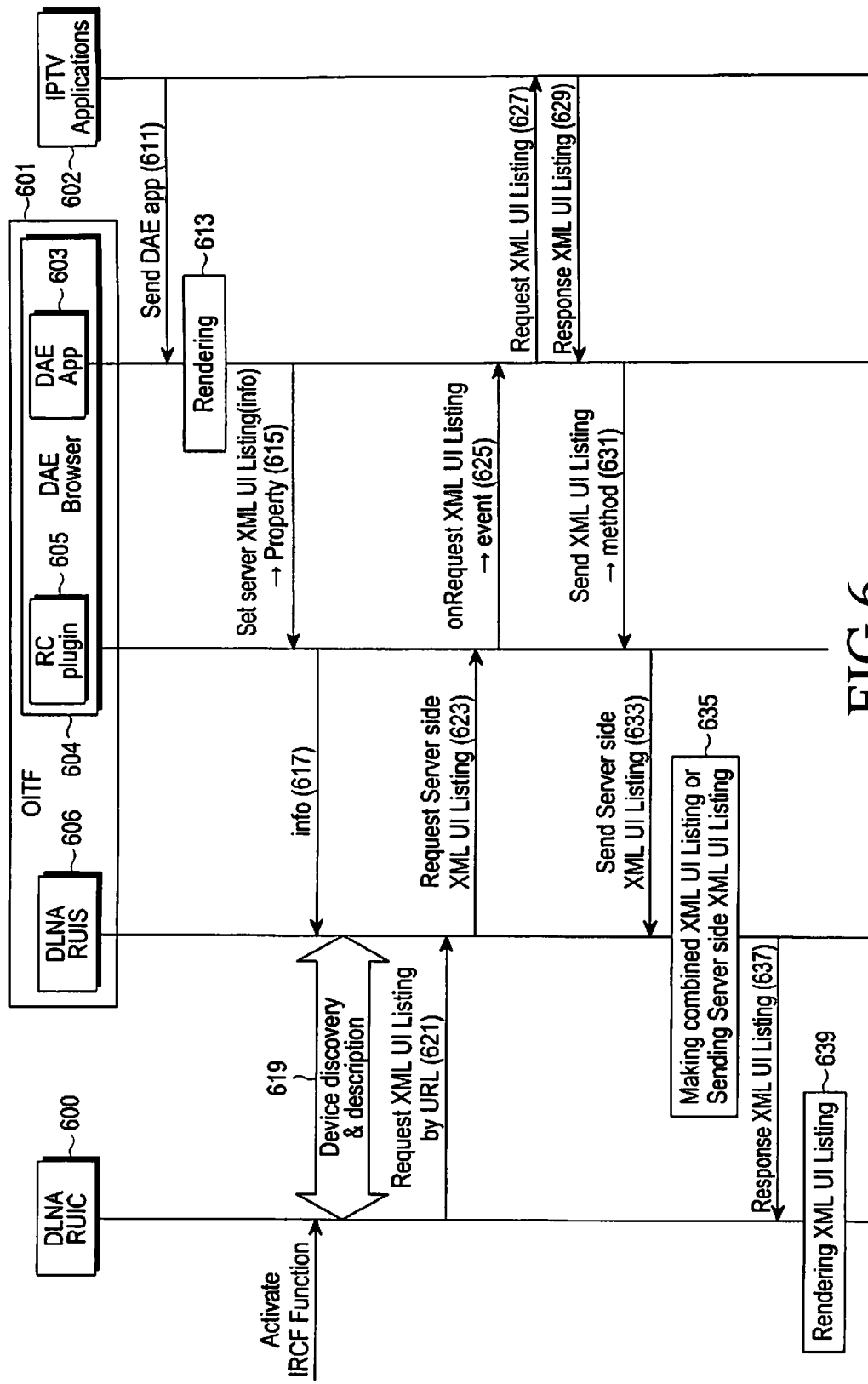
FIG. 6 is a flow chart illustrating a method for providing a UI list in accordance with an embodiment of the present invention.

FIG. 6 is a flow chart illustrating the method for providing the UI list in accordance with the embodiment of the present invention, wherein the method is applied to the Open IPTV Forum standard. Hereinafter, the general definition of the abbreviations, such as OITF, DAE, DLNA and etc. may be referred to the Open IPTV Forum standard well known in the field of art, and thus the detailed description thereof will be omitted in the present application.

Referring to FIG. 6, an IPTV applications server 602 transmits a Declarative Application Environment (DAE) application 603 to an Open IPTV Terminal Function (OITF) terminal 601 in step 611. The transmitted DAE application 603 is driven in a DAE browser 604 in step 613. Here, in step 615, that the IPTV applications server 602 includes the remote UI list is established in the Remote Control Plugin 605 using a setServerSideXm1UIListing Property. Simply, the information about the existence of the remote UI list is represented by True/False. Otherwise, it is possible to use numbers or letters. For instance, "O" represents the use of the UI list in the OITF; "1" represents the use of the UI list in IPTV applications server; and "2" represents the use of the combination of two UI lists.

In step 617, a Remote Control Plugin 605 transmits the information to DLNA Remote User Interface Server (RUIS) 606. The DLNA RUIC 600 discovers OITF terminal 601 in step 619; the DLNA Remote User Interface Client (RUIC) 600 transmits the requests for the UI list to the OITF terminal 601 in step 621; DLNA RUIS 606 in the OITF terminal 601 requests the Remote Control Plugin 605 for the UI list in the IPTV applications server 602 in step 623; the Remote Control Plugin 605 requests the DAE application 603 for the corresponding UI list in the form of an event in step 625. When receiving the request for the event, the DAE application 603 requests the IPTV applications server 602 for the UI list and receives the latter therefrom in Steps 627 and 629.

As described with reference to FIG. 3, the UI list included in IPTV applications server 602 may be received in advance between the time after the DAE application 603 is driven and the time before the request for the UI list is received from the Remote Control Plugin 605.

The DAE application 603 transmits the UI list received from the IPTV applications server 602 to the Remote Control Plugin 605 through a parameter of the method in step 631; and the Remote Control Plugin 605 transmits the UI list received from the DAE application 603 to the DLNA RUIS 606 in step 633. DLNA RUIS 606 transmits the UI list to the DLNA RUIC 600 in accordance with the method previously established by the DAE application 603 in steps 635 and 637. Thereafter, the DLNA RUIC 600 displays the UI list received from DLNA RUIS 606 on a display in step 639.

Table 1 shown below represents contents that may be specified on the DAE specification included in the Open IPTV Forum standard in accordance with the embodiment of the present invention.

TABLE 1

| Properties |
| --- |
| Boolean useServerSidexmlUIListing |
| If the useServerSideXMLUIListing property is set to "true", the DLNA RUIS sends the Server Side XML UI Listing to the DLNA RUIC (+RUIPL+) when the DLNA RUIC (+RUIPL+) requests the XML UI Listing to the DLNA RUIS. However, if the useServerSideXMLUIListing property is set to "false", the DLNA RUIS sends the OITF XML UI Listing to the DLNA RUIC (+RUIPL+). The default value is "false". When the DAE application which contains the Remote Control Function object is terminated, this value is set to "false" automatically. |
| function onXmlUIListingRequest( Integer remoteDeviceHandle ) |
| The function that is called when the Remote Device requests a XML UI Listing that will be used for the capability matching and show the Control UI List to the user in the Server Side XML UI Listing scenario (see Annex I.2). This method is only used when the useServerXMLUIListing property is set to "true". |
| The specified function is called with a single argument remoteDeviceHandle which is defined as follows: |
| Integer remoteDeviceHandle - the handle of the Remote Device which is currently being connected to the OITF and requests the Server Side XML UI Listing. |

| Methods | | |
| --- | --- | --- |
| Boolean sendXmlUIListing ( Integer remoteDeviceHandle, String xmlUIListing ) | | |
| Description | Send the server Side XML UI Listing to the Remote Devices related to the remoteDeviceHandle. This method SHALL return true if the operation succeeded, or false if it failed. | |
| Arguments | remoteDeviceHandle | The handle of the Remote Device which are currently connected to the OITF. |
| Arguments | xmlUIListing | The Server Side XML UI Listing which is located in the IPTV Applications server. |

First, the Property represented in Table 1 includes the usesServerSideXm1UIlisting property. If the property is established with the value of TRUE and the request for the UI list is received from the DLNA RUIC device, the UI list included in the IPTV applications server 602 is transmitted. Otherwise, if the value of FALSE is established, the UI list included in the OITF terminal 601 is transmitted.

Next, the onXm1UIListingRequest event described in step 625 represents the event occurring in the DAE application 603 when receiving the request for the UI list from the DLNA RUIC device 600.

Finally, in step 631, the described sendXMLUIListing method is included. By way of this method, the DAE application 631 may transmit the UI list included in the IPTV applications server 602 to the DLNA RUIC device 600 through the DLNA RUIS 603.

Figure 7:
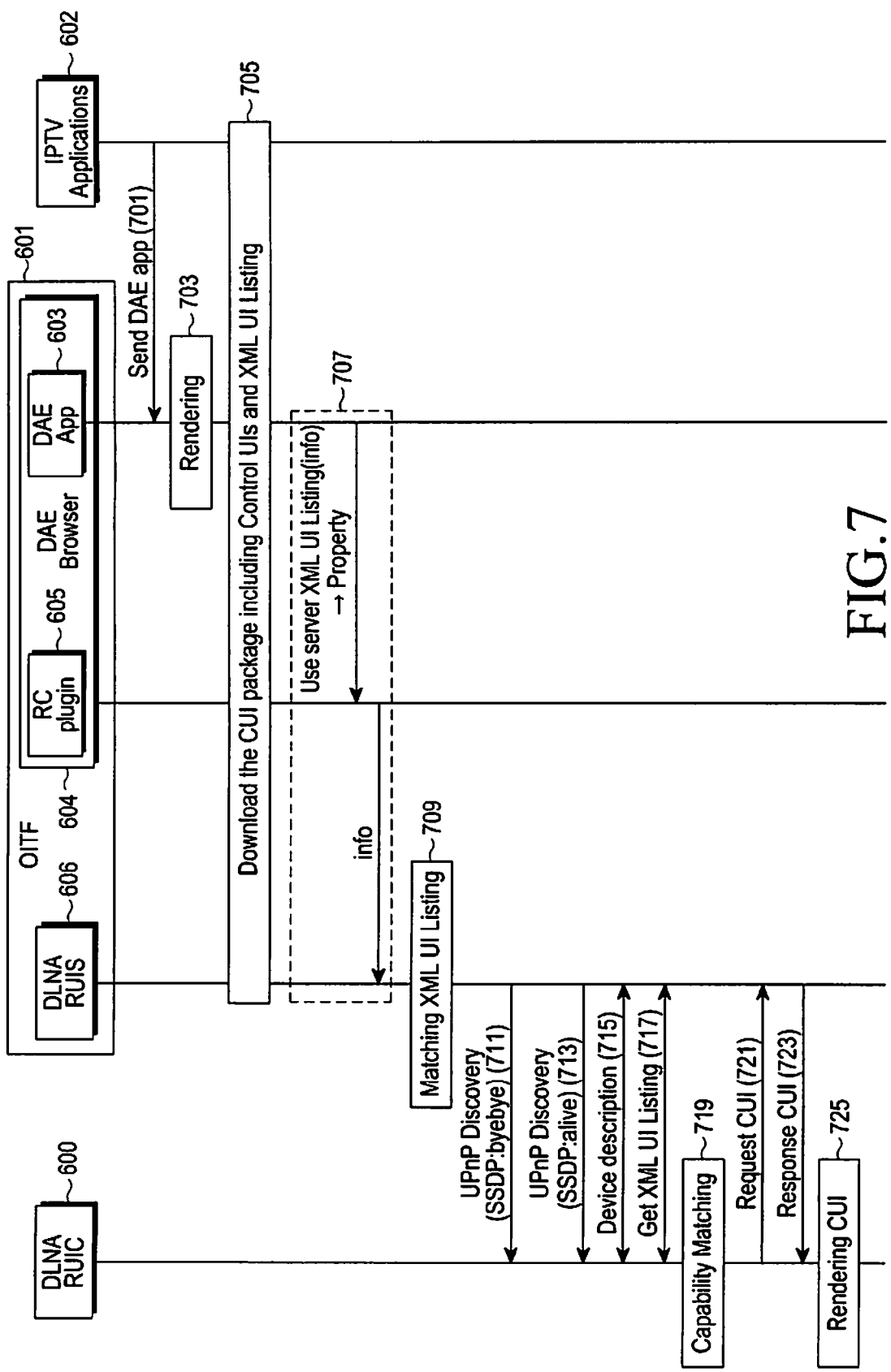
FIG. 7 is a flow chart illustrating another method for providing a UI list in accordance with an embodiment of the present invention.

FIG. 7 is a flow chart illustrating another method for providing the UI list in accordance with the embodiment of the present invention, wherein the method is applied to the Open IPTV Forum standard.

Referring to FIG. 7, the IPTV applications server 602 transmits the DAE application 603 to the OITF terminal 601 in step 701. The transmitted DAE application 603 is driven in the DAE browser 604 in step 703. Here, the DAE application 603 instructs the Remote Control Plugin 605 to download a control UI package (e.g., compressed form) from the IPTV applications server 602 in step 705. The control UI package includes a Control UI (CUI) and a UI list for the control UI (XML UI list). Here, the downloaded control UI package (CUI package) is decompressed in the DLNA RUIS 606 and then a single UI list is obtained by combining the UI list included in the DLNA RUIS 606 and the UI list included in the control UI package (CUI package). As such, the single UI list is obtained in step 709 after downloading and decompressing. In another case, the DAE application 603 instructs the Remote Control Plugin 605 to produce a new UI list along with information for producing the new UI list as in step 707, so that the Remote Control Plugin 605 may produce the UI list on the basis of the corresponding information. Here, the information transmitted along with the instruction may be varied. Specifically, it includes information that produces the single UI list by combining the UI list included in the DLNA RUIS 606 and the UI list included in the control UI package (CUI package); information that uses only the UI list included in the control UI package (CUI package); and information that uses only the UI list included in the DLNA RUIS 606. When producing the UI list based on the corresponding information, URL information about the UI in the UI list included in the control UI package (CUI package) may be modified in the DLNA RUIC 600 so as to make it possible to access the control UI within the control UI package (CUI package) installed in the DLNA RUIS 606.

If the UI list is produced on the basis of the corresponding information in step 709, the DLNA RUIS 606 transmits an UPnP Discovery (SSDP:byebye) message to the DLNA RUIC 600 in order to transmit the newly produced UI list to the DLNA RUIC 600 in step 711 and thereafter it transmits the UPnP Discovery (SSDP:alive) message in step 713. Here, the SSDP stands for Simple Service Discovery Protocol.

In case that only the UPnP Discovery (SSDP:alive) message is transmitted in step 715 without executing steps 711 and 713, the Capability Matching may be skipped based on the previously-produced UI list, if the DLNA RUIC 600 experienced the Capability Matching beforehand. However, with the execution of steps 711 and 713 for transmitting the SSDP:byebye message and the SSDP:alive message, respectively, the DLNA RUIC 600 fetches a new XML UI list from the DLNA RUIS 606 by way of Device Description in steps 715 and 717 and then the Capability Matching is executed again in step 719.

If the scenario assumes that the DLNA RUIC 600 did not previously experience the Capability Matching, or if the OITF terminal 601 is informed of the fact that the DLNA RUIC 600 did not previously experience the Capability Matching, the SSDP:byebye message in step 711 is not transmitted and only the SSDP:alive message in step 713 is transmitted.

Thereafter, the DLNA RUIC 600 receives the control UI from the DLNA RUIS 606 in steps 721 and 723 on the basis of the information matched in step 719 and the control UI received from the DLNA RUIS 606 is displayed in the DLNA RUIC 600 in step 725.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for providing a User Interface (UI) list in a remote system, the method comprising:
   executing, by a first terminal which communicates with a remote server, an application;
   on the basis of a message that an embedded server in the first terminal receives from the application,
   generating, by the embedded server in the first terminal, a new UI list by combining a UI list currently included in the embedded server and a UI list of the remote server enclosed in the message;
   receiving, by the embedded server in the first terminal, a request for the UI list from a second terminal; and
   sending, by the embedded server in the first terminal, the new UI list to the second terminal,
   wherein the new UI list includes information on a number of control Uls for controlling the application.

2. The method as claimed in claim 1, wherein generating the new UI list comprises:
   sending, by the embedded server in the first terminal, a Universal Plug and Play (UPnP) Discovery (SSDP:byebye) message and sending a UPnP Discovery (SSDP:alive) message to the second terminal in order to notify the second terminal of the need to retrieve the new UI list after generating the new UI list.

3. The method as claimed in claim 1, wherein generating the new UI list comprises:
   sending, by the embedded server in the first terminal, a UPnP (Universal Plug and Play) Discovery (SSDP:alive) message to the second terminal in order to notify the second terminal of the need to retrieve the new UI list after generating the new UI list, in a case that the embedded server in the first terminal does not have a history of executing a capability matching with the second terminal or of sending the UI list to the second terminal.

4. The method as claimed in claim 2, further comprising:
   executing, by the embedded server included in the first terminal, a capability matching with the second terminal after sending the UPnP Discovery (SSDP:alive) message to the second terminal.

5. The method as claimed in claim 3, further comprising:
   executing, by the embedded server included in the first terminal, the Capability Matching with the second terminal after sending the UPnP Discovery (SSDP:alive) message to the second terminal.

6. A terminal apparatus for providing a User Interface (UI) list in a remote UI system, the apparatus comprising:
   a browser including an application; and
   an embedded server,
   wherein the embedded server of the terminal apparatus, on the basis of a message received from the application, generates a new UI list by combining a UI list currently included in the embedded server and a UI list of a remote server enclosed in the message, and sends, via a transmitter of the terminal apparatus, the new UI list to an other terminal according to a reception of a request for the UI list from the other terminal, and
   wherein the new UI list includes information on a number of control Uls for controlling the application.

7. The terminal apparatus as claimed in claim 6, wherein the embedded server sends a UPnP (Universal Plug and Play) Discovery (SSDP:byebye) message and thereafter UPnP Discovery (SSDP:alive) message to the other terminal in order to notify the other terminal of the need to retrieve the new UI list after generating the new UI list.

8. The terminal apparatus as claimed in claim 6, wherein the embedded server sends a UPnP (Universal Plug and Play) Discovery (SSDP:alive) message to the other terminal in order to notify the other terminal of the need to retrieve the new UI list after generating the new UI list, in a case that the embedded server does not have a history of executing Capability Matching with the other terminal or of sending the UI list to the other terminal.

9. The terminal apparatus as claimed in claim 7, wherein the embedded server executes the Capability Matching with the other terminal after sending the UPnP Discovery (SSDP:alive) message to the other terminal.

10. The terminal apparatus as claimed in claim 8, wherein the embedded server executes the Capability Matching with the other terminal after sending the UPnP Discovery (SSDP:alive) message to the other terminal.

* * * * *